United States Patent
Polcyn et al.

[19]

[11] Patent Number: 6,061,433
[45] Date of Patent: May 9, 2000

[54] DYNAMICALLY CHANGEABLE MENUS BASED ON EXTERNALLY AVAILABLE DATA

[75] Inventors: Michael J. Polcyn; Ronald David Lindner, Jr., both of Allen, Tex.

[73] Assignee: InterVoice Limited Partnership, Reno, Nev.

[21] Appl. No.: 08/967,869

[22] Filed: Nov. 12, 1997

Related U.S. Application Data

[63] Continuation of application No. 08/545,389, Oct. 19, 1995, abandoned.

[51] Int. Cl.[7] .............................. H04M 11/00; H04M 1/64
[52] U.S. Cl. .................................. 379/93.12; 379/88.23; 379/88.25; 379/93.23; 379/221
[58] Field of Search ............................. 379/93.17, 88.23, 379/88.25, 93.12, 91.02, 127, 142, 210–212, 220, 221, 265, 266, 88.19, 88.2, 88.21, 93.23, 354

[56] References Cited

U.S. PATENT DOCUMENTS

| | | | |
|---|---|---|---|
| 4,932,021 | 6/1990 | Moody | 379/67 |
| 4,972,462 | 11/1990 | Shibata | 379/98 |
| 5,003,595 | 3/1991 | Collins et al. | 379/93.02 |
| 5,389,773 | 2/1995 | Coutts | 235/379 |
| 5,410,344 | 4/1995 | Graves et al. | 348/1 |
| 5,463,681 | 10/1995 | Vaios et al. | 379/93.02 |
| 5,561,711 | 10/1996 | Muller | 379/265 |

*Primary Examiner*—Forester W. Isen
*Assistant Examiner*—Xu Mei
*Attorney, Agent, or Firm*—Fulbright & Jaworski L.L.P.

[57] ABSTRACT

There is disclosed a system and method in an automated telephone system for obtaining data from sources other than the caller's answer to menu queries and directing incoming calls directly to preferred applications instead of to an introductory menu. In one embodiment, a statistical engine measures individual customer usage and stores the results in a usage history database. An inference engine then prioritizes the available applications based on past usage. When an individual customer next calls, the server can either request account and PIN numbers or trap ANI/DNIS data from the public telephone system in order to identify the individual customer. Once the customer is identified, the server branches directly to that individual customer's preferred applications. The log-in history includes time and place of call-in so that an aberrant usage alarm may be triggered by the automated telephone system that alerts customers to any unusual accesses to their personal accounts.

22 Claims, 3 Drawing Sheets

DYNAMICALLY CHANGEABLE MENUS BASED ON EXTERNALLY AVAILABLE DATA

CROSS REFERENCE TO RELATED APPLICATION(S)

This is a continuation of application Ser. No. 08/545,389 filed on Oct. 19, 1995, now abandoned.

TECHNICAL FIELD OF THE INVENTION

The present invention pertains in general to a menu driven system which responds to externally available data pertaining to each user for increasing efficiency of interactive response applications and in particular to an interactive response system which compiles a historical record of past usage of applications by individuals and transfers future incoming calls of individuals directly to those applications, data/information elements or menus, which have been most often used in the past.

BACKGROUND OF THE INVENTION

In recent years there has been a great increase in the number and diversity of interactive information response applications, such as voice response, accessible through automated telephone systems. These interactive response applications allow a caller to obtain information, purchase goods, and conduct financial transactions through a series of scripted menus or options that offer the caller a variety of selections from which to choose. The incoming caller responds to menu voice or other data prompts either by pressing numbers on a telephone keypad (DTMF inputs) or by speaking a specific word or words or by requesting other data from a processor. The incoming server then decodes the response to determine which menu choice the caller selected. Depending on the complexity of the applications selected by the caller, he or she may be required to interact with many different levels of menu choices in order to properly access and obtain the desired information.

As the number of applications accessible through such systems increases, and as the complexity of individual applications increases, the menu lengths correspondingly increase. The result is that incoming callers frequently spend a considerable amount of time interacting with and selecting menu choices even if they are only accessing only a single application.

The obvious drawback is that the maximum throughput of a server decreases as the length and complexity of the menus increases. The call handling capability (or bandwidth) of a server is limited by the number of phone lines coupled to the server and the incoming rate and average duration of calls received by the server. As the average duration of the calls increases, less calls may be serviced, thereby reducing the throughput of the server.

To compensate for this, some automated telephone systems are augmented by simply adding additional incoming telephone lines to an existing server, or adding additional servers, or both. Obviously, this solution is expensive because of the increased costs of purchasing new equipment, maintaining a greater amount of equipment, and paying service charges for additional telephone line connections.

An alternative method for increasing or maintaining the throughput of a server is to decrease the average duration of incoming telephone calls. To do this, prior art systems have employed voice-scripted menus that informed the caller that a menu selection may be made at any time during the recitation of the menu, and not merely at the end of the menu. Thus, rather than listen to a menu that explains 7 or 8 possible selections, a caller who has used the system in the past may immediately press a desired selection without wasting the time that is required to listen to the entire menu. One drawback to this, however, is that even frequent system users often forget the order in which menus are presented, as well as the individual selections within each menu, and frequently enter a premature and incorrect entry. This usually requires the caller to start over.

A less obvious drawback to this method of reducing the average call duration is that callers who frequently use multiple applications each time they call the server must repeatedly branch back to the introductory menu for each application desired. For example, a caller who wishes to use three different applications can immediately choose the first application without listening to the entire menu. When the caller has concluded the first transaction, the caller must then branch back to the introductory menu in order to select the second desired application. This process is then repeated for the third application. Thus, even when a caller is allowed to make a selection at any time during a menu, the caller must still loop through a menu several times in order to use multiple applications. Therefore, the average call duration is still not minimized.

There is therefore a need in the art for an interactive voice response system that increases the throughput of telephone calls handled by response systems without increasing the number of servers or the number of incoming telephone lines.

There is a further need in the art for a response system that reduces the average duration of incoming telephone calls without relying on the memory abilities of callers.

There is a still further need in the art for an interactive voice response unit that can detect aberrant or unusual usage patterns for a particular customer account and send a warning alarm to that particular customer or system administrator.

SUMMARY OF THE INVENTION

These and other problems inherent in the prior art have been solved by the present invention which provides systems and methods for gathering and analyzing statistical data related to the past usage of particular applications by individual callers, storing the usage history information in a database, and thereafter directing incoming calls from individual callers to one or more preferred applications based on each caller's past usage.

In one embodiment of the present invention, there is provided an interactive voice response (IVR) server which captures and decodes ANI/DNIS information associated with each incoming call, identifies each caller based on the ANI/DNIS information, and retrieves account information and usage history information related to each individual caller.

In another embodiment of the present invention, there is provided an IVR server which captures and decodes ANI/DNIS information associated with an incoming call, records the time and point of origin of the incoming call, and compares the time and point of origin of the incoming call with the usage history information stored in the IVR server database. If the time and point of origin of the incoming call are significantly different than the past usage information, the present invention will generate an aberrant usage alarm.

It is one technical advantage of this invention that a particular user's pattern of inquiry for each application is monitored and used in subsequent inquiries from that user to direct that user to the desired information without requiring continued interactive responses from that user. Thus, a user, dialing into the system need only be positively identified and the data usually requested by that user will be provided automatically without further prompting. If the user normally requests second and third applications (such as checking balance, stock balance, savings balance) the system will provide that information in that order without requiring the user to cycle through several menus.

The foregoing has outlined rather broadly the features and technical advantages of the present invention in order that the detailed description of the invention that follows may be better understood. Additional features and advantages of the IVR server will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the IVR server as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
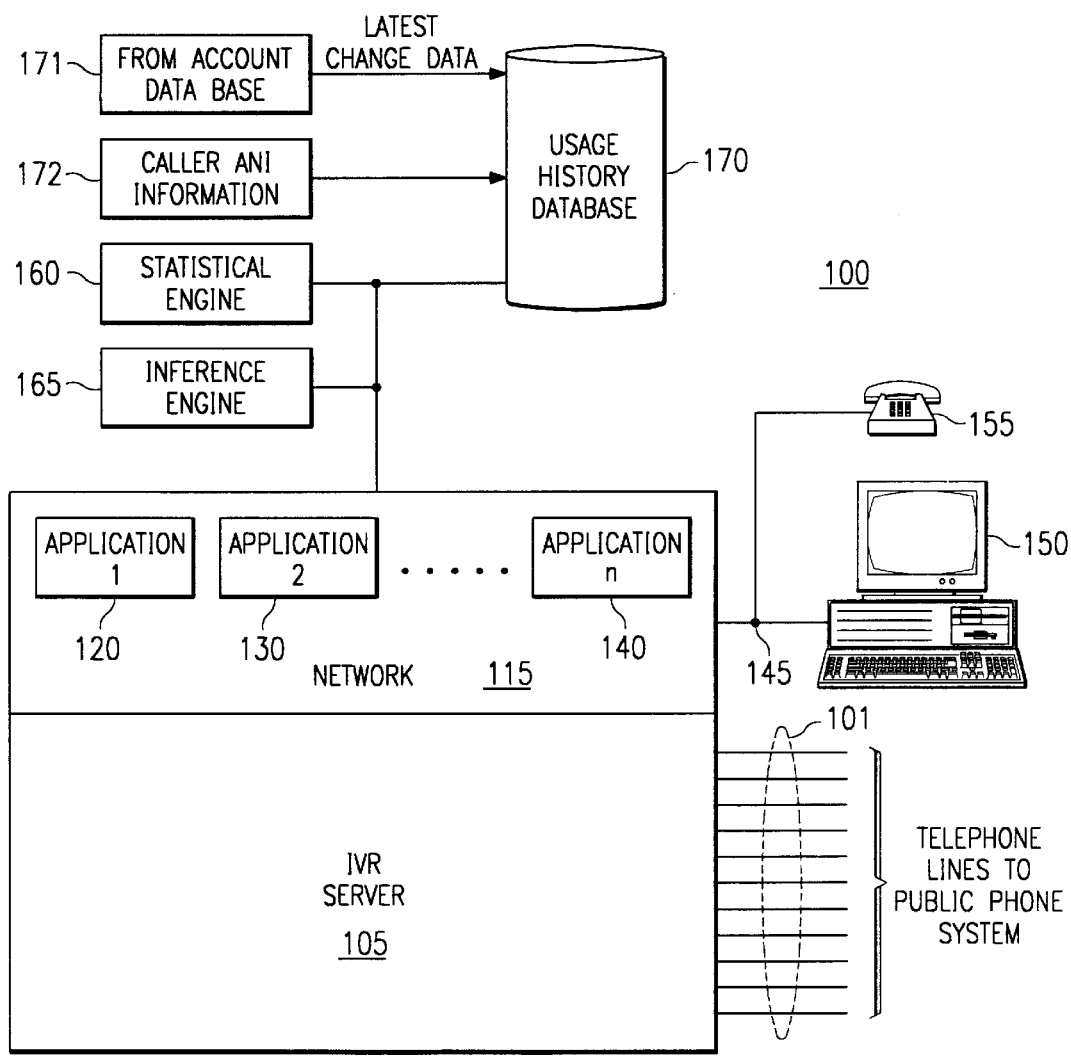
FIG. 1 is a block diagram of an automated telephone system employing an interactive voice response server in accordance with the present invention.

FIG. 1 depicts automated telephone system 100 coupled to telephone lines 101 of the public telephone system. In one embodiment, using a voice response system, IVR server 105 answers via one of the network's 115 incoming calls on telephone lines 101, plays voice-scripted menus to prompt callers for spoken words or DTMF inputs, and decodes the caller's spoken word or DTMF response in order to determine the IVR applications the caller wishes to use.

Based on the caller's input selection, IVR server 105 accesses one or more selected applications 120, 130, 140, etc., from a group of available applications. IVR server 105 is coupled to a statistical engine 160, inference engine 165 and usage history data base 170. Statistical engine 160 monitors the applications accessed by callers through IVR server 105 and updates the statistics in usage history data base 170.

Typically, applications 1-N reside in network 115. In alternate embodiments, one or more of applications 1-N are resident within IVR server 105 itself or resident in a central computer system (not shown) coupled directly to IVR server 105.

Applications 1-N may consist of any one of a number of IVR applications, including bank account information, voice messaging, stock market or other financial market information, pension plan information, 401(k) plan information, catalog applications, and many others. When necessary, an IVR application allows a caller to speak to a human agent using communication link 145 to connect to agent telephone 155 and agent computer work station 150.

For the purpose of simplicity, the exemplary IVR application used hereafter to describe the present invention relates to a banking IVR application. Banking IVR applications are among the most popular IVR applications and provide a useful illustration of the deficiencies of the prior art that the present invention is intended to overcome. Nonetheless, it should be clear to those skilled in the art that the system and methods disclosed herein apply with equal force to other types of IVR applications besides banking IVR applications. One such other application is the travel industry inquiring data base, such as used to obtain flight information or catalog ordering systems.

In addition, it should also be clear to one skilled in the art that the present invention can also be used with respect to non-voice applications. For example, the present invention can be used when a caller uses a data terminal, personal computer, or other device to access a server. Instead of altering the order of voice menus as discussed below, the non-voice server would change the order of text menus or other information sent to the caller's device.

When a bank customer opens a new account, personal information about the customer is stored in the central computer system (not shown) of the bank, including the customer's name, address, home telephone number, and business telephone number. The customer receives an account number for as many accounts as the customer may have and at least one PIN number to be used for security purposes whenever the bank customer calls IVR server 105 to retrieve account information.

Over time, as a particular caller uses IVR server 105 more and more often, the statistics compiled in usage history database 170 by statistical engine 160 indicate which IVR applications that particular caller most frequently uses. Inference engine 165 determines one or more preferred IVR applications for that particular caller. Thereafter, when that customer calls IVR server 105, inference engine 165 directs IVR server 105 to automatically access one or more of the preferred IVR applications. In this way, by going directly to the customer's preferred IVR applications, IVR server 105 can bypass introductory menus which consume time. Also, the customer caller is not required to remember menu selections for the most preferred IVR applications.

In addition, the customer could choose one or more predetermined options, such as preferred IVR applications, when opening a new account. Inference engine 165 would use the predetermined options as the initial settings until, over time, the customer's activity history displaces the predetermined options.

Figure 2:
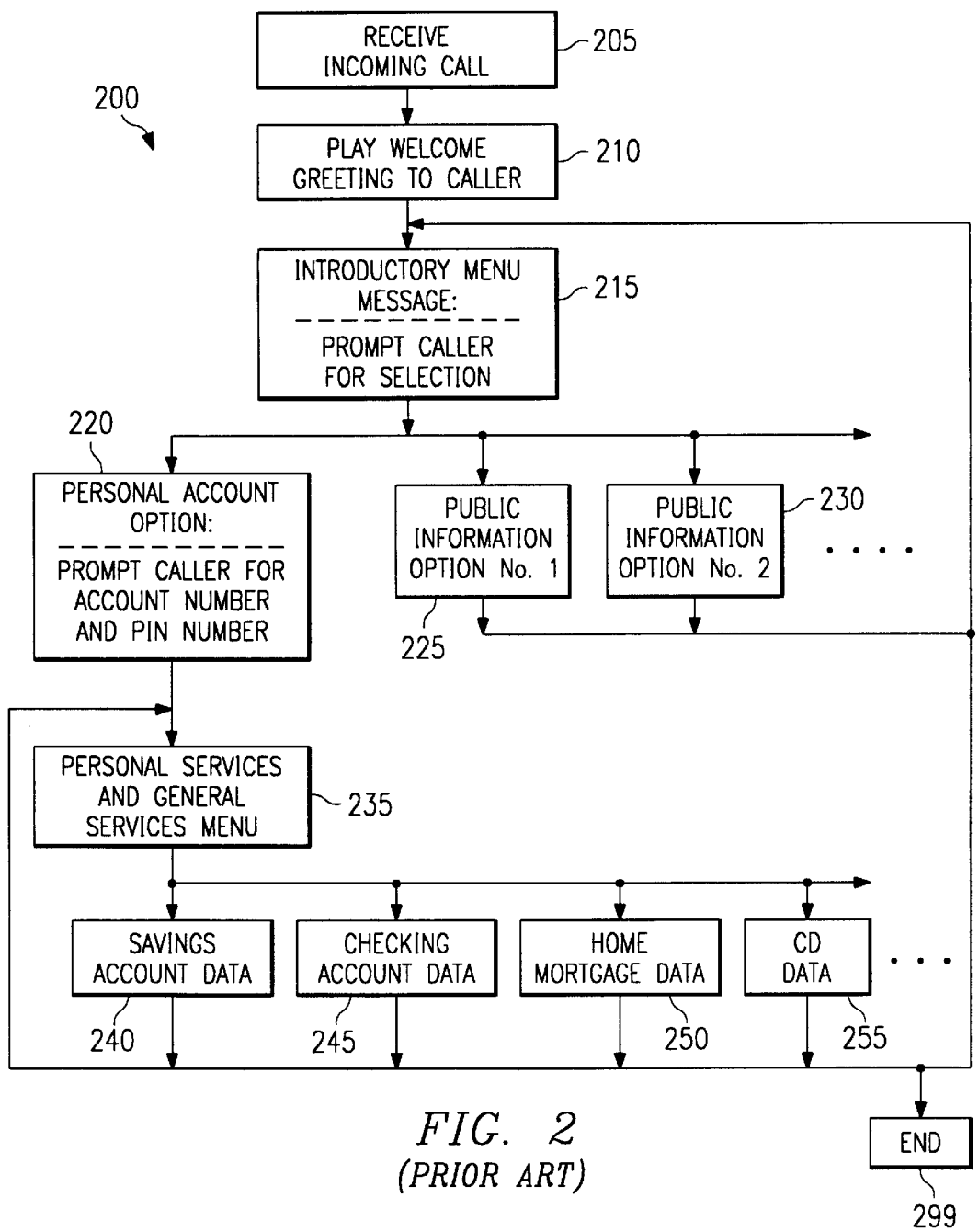
FIG. 2 is a flow diagram of a prior art interactive voice response session.

To better illustrate the shortcomings of the prior art, attention is now directed to FIG. 2 which depicts flow diagram 200 of a typical voice-scripted telephone call session in accordance with a prior art IVR server. When a call is received, the prior art IVR server answers the call and plays a welcome message of some sort to the caller (Steps 205 and 210). An introductory menu of possible IVR application selections is then played to the caller and the caller is prompted to make a selection, usually by pressing DTMF keypad inputs on a push button telephone (Step 215).

Depending on the menu options selected by the caller, the prior art IVR server then branches to any one of a number of personal or general IVR applications (Steps 220, 225 and 230). The general menu options include publicly available information about the bank (or other business) such as current mortgage rates, CD rates, money market rates, home equity loan rates, etc. If, however, the incoming caller has selected a menu option that allows the caller to access personal account information (Step 220), the prior art IVR server prompts the caller for an account number and a Personal Identification Number (i.e., PIN number).

After the caller has provided this information, using DTMF keypad inputs, the prior art IVR server retrieves the caller's personal records and determines what menu options are available to that particular caller. The prior art IVR server plays a voice-scripted menu including both personal account information options and general information options (Step 235). The general information in Step 235 may include some or all of the publicly available information accessible in Steps 225 and 230.

Depending on the caller's DTMF inputs in response to the prompts in Step 235, the prior art IVR server branches to Steps 240, 245, 250 or 255 to obtain personal account information, such as savings account balance, checking account balance, home mortgage payment information and CD information, among others. After this information has been relayed to the caller, the caller may hang up to end the session (Step 299), or may select a new menu option that branches back to the start of the introductory menu in order to obtain additional information.

As is evident from flow diagram 200 in FIG. 2. the caller spends a great deal of time listening to menu selections. The time required may be reduced if the caller knows from memory the correct DTMF inputs to push at the start of each selection menu. The caller can thereby avoid listening to the entirety of each menu and progress through the multiple levels of flow diagram 200 at a greater pace. However, few customers call an IVR application frequently enough to memorize entire menu paths. Furthermore, if a caller wishes to access more than one IVR application each time he or she calls IVR server 105, the caller must still select one menu option at a time and loop back to a previous selection menu in order to access additional IVR applications.

Figure 3:
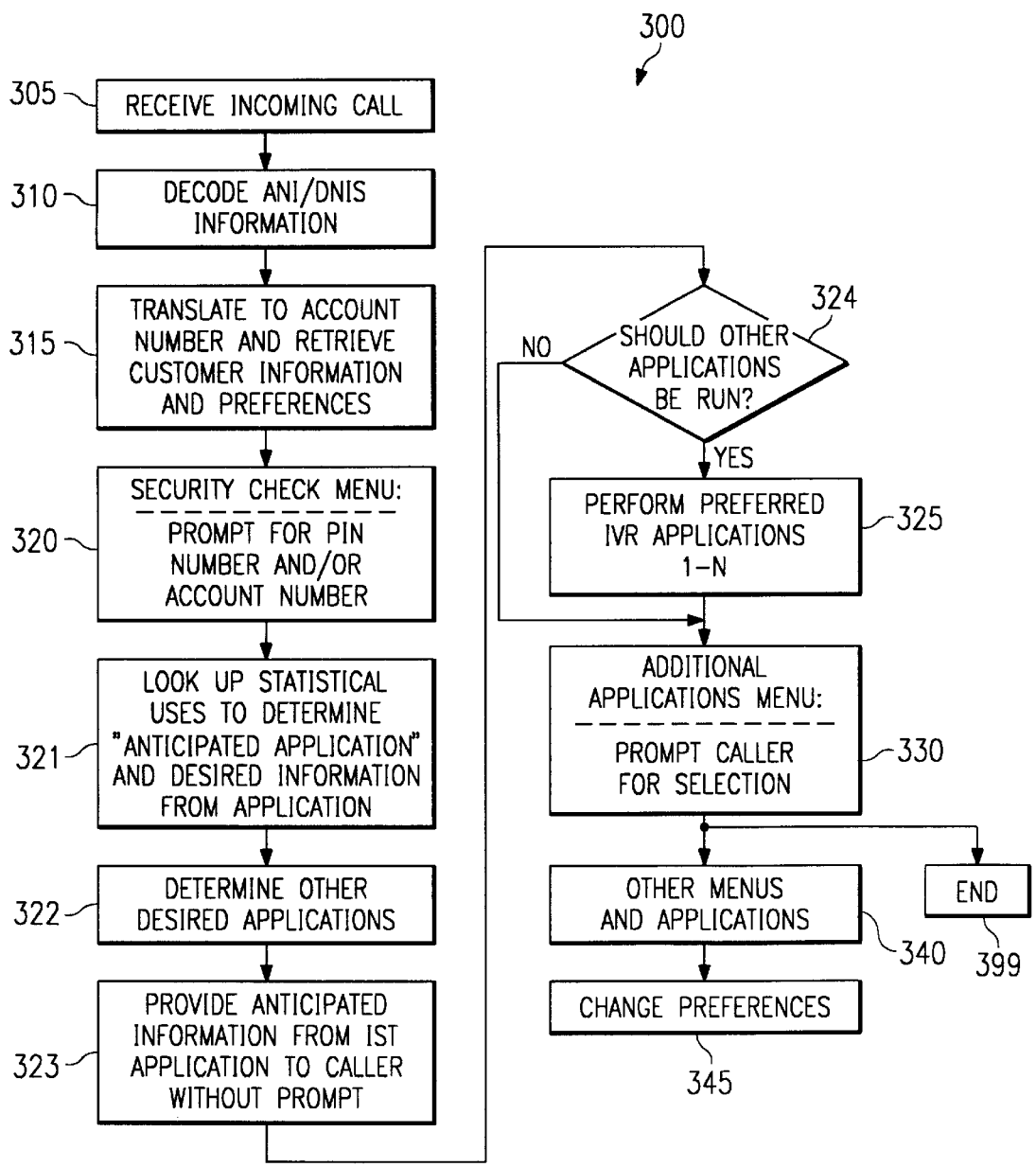
FIG. 3 is a flow diagram of an interactive voice response session in accordance with the present invention.

FIG. 3 depicts flow diagram 300 of a typical voice-scripted telephone call session in accordance with the present invention. After a customer caller has accessed one or more of applications 1-N through IVR server 105 a sufficient number of times, or based upon predetermined options, inference engine 165 will determine one or more preferred applications for that particular caller.

In a preferred embodiment of the present invention, IVR server 105 receives incoming calls on telephone lines 101 and decodes the ANI/DNIS information associated with each call. ANI/DNIS information and circuits and systems to decode the same are well known in the art and are widely used with toll free (800) numbers to identify telephone callers and access their accounts. ANI/DNIS information is also widely used in Caller ID devices which identify the telephone number of a person placing a telephone call to the owner of the Caller ID device.

Most bank customers call IVR server 105 from a home telephone or an office telephone. Since both of these telephone numbers were recorded when the account was opened, IVR server 105 is able to identify the incoming caller using the captured ANI/DNIS data and retrieve the account information of the bank customer associated with that telephone number. (Steps 305, 310 and 315). The present state of the art is such that IVR server 105 can capture and decode the ANI/DNIS telephone number data, retrieve the corresponding customer account information, if applicable, and answer (i.e., take off-hook) the incoming call in less than a second.

In an alternate embodiment of the present invention, IVR server 105 identifies a caller by using a prompt message at the start of the call session that requests the caller's account number. Additionally, in a preferred embodiment of the present invention, if IVR server 105 captures ANI/DNIS data and cannot match the data to an existing telephone number in the bank database (caller is not using home or office phone), IVR server 105 uses a prompt message in a fall-back mode to identify the caller.

If IVR server 105 determines from either the ANI/DNIS data or the entered account number that a call has been received from a customer caller who frequently uses the same IVR applications or has selected predetermined options, IVR server 105 may bypass the welcome greetings and introductory menu messages in Steps 210 and 215 of FIG. 2. IVR server 105 instead performs a short and relatively simple security check which prompts the caller for the caller's PIN number and/or bank account number (Step 320).

If the caller correctly identifies himself or herself by entering the proper PIN number, IVR server 105 will branch directly to steps 321 and 326 to obtain the IVR applications preferred by the individual caller and in steps 323 and 324 the relevant data is given to the caller. For example, if an individual caller has historically called IVR server 105 to retrieve savings account balance and checking account balance, (in that order) IVR server 105 may simply play a message to the caller stating: "Your savings account balance is $8,327.19. Your checking account balance is $525.35. Press 1 if you wish your CD balance or 2 for other selections."

The last sentence of this message is the prompt message in Step 330. At this point the caller may either hang up to terminate the call (Step 399) or may press 2 on the DTMF keypad of the telephone in order to access other IVR menus and applications (Step 340). The caller could be given the option, step 345, of changing the order of presentations.

As the streamlined flow diagram 300 in FIG. 3 demonstrates, a caller may retrieve savings account and checking account information through IVR server 105 in a matter of only a few seconds. The present invention short-cuts the long introductory menu messages by branching directly to the caller's preferred IVR applications based on the caller's past usage.

As outlined above, the present invention would be slow to account for the situation where a frequent caller changes preferences over time. The present invention would continue to direct the caller to savings account and checking account applications, even if the caller no longer, or rarely, needed that information until such time as the caller has used the other services a number of times. It is preferable that the present invention dynamically adjust to changing customer preferences.

Therefore, in a preferred embodiment of the present invention, Step 325 of FIG. 3 contains a short message prompt to determine if the caller wants the known preferred applications. For example, IVR server 105 could play a prompt such as: "Press 1 to connect with your usual services. Press 2 for other selections." If the caller selects 2, IVR server 105 will play a long sequence of standard introductory messages as in FIG. 2. If the caller selects 1, IVR server 105 will proceed directly to the preferred applications, as outlined above.

In this manner, statistical engine 160 and inference engine 165 are able to determine a change in preferred applications by individual callers. For example, if an individual caller known to prefer savings account applications continually presses 2 in response to the above message and afterward selects a mortgage rate application, inference engine 165 will modify the preferred IVR application from the savings account application to the mortgage rate application.

Likewise, a preferred IVR application may be expanded by monitoring the caller's response to the Step 330 prompt. If, after receiving the preferred savings account and checking account information, the caller consistently presses 1 for additional selections and then requests CD rate information, inference engine 165 responds by updating the caller's list of preferred applications. Then, IVR server 105 modifies Step 325 to include CD rates, as follows: "Your savings account balance is $8,327.19. Your checking account balance is $525.35. The current CD rate is 6.25%. Press 1 for additional selections."

In a preferred embodiment of the present invention, statistical engine 160 and inference engine 165 use a moving window of the last N calls received from a particular caller to determine the preferred application(s) of that caller. The window size may be determined by the system operator. Shorter windows (i.e., less than 10 calls) enable IVR server 105 to react more quickly to changes in callers' preferences by dropping older call records sooner. Conversely, longer windows cause IVR server 105 to react more slowly to changes in callers' preferences. However, longer windows have the advantage of not over-reacting to short, temporary changes in the applications accessed by individual callers.

Also, in a preferred embodiment of the present invention, statistical engine 160 monitors and detects selections of certain applications by an individual caller that repeatedly occur at the same time of day, or on the same weekday or day of the month. Likewise, predetermined options could be selected based on the same criteria.

The situation is likely to occur when a caller always receives a direct deposit paycheck on a certain day of the week or certain days of the month, for example, every second Friday. On each payday, the caller may call IVR server 105 to verify the caller's checking account balance, verify the caller's savings account balance, and transfer money from checking to savings.

In this situation, inference engine 165 determines that the caller uses certain preferred applications on every second Friday. When a call is received by that caller and the call occurs on the second Friday after the last such access, IVR server 105 will direct the call to the preferred applications after verifying the caller's PIN number. In this case, the caller would hear a voice prompt such as: "Your savings account balance is $8,327.19. Your checking account balance is $2525.35. Press 1 to transfer money from your checking account to your savings account. Press 2 for additional selections."

Another trigger for the system could be to monitor changes to different accounts (171 FIG. 1) and to lead off the session with a list of changed accounts, the amounts of such changes and the latest balance.

In a preferred embodiment of the present invention, IVR server 105 also uses ANI/DNIS data (172 FIG. 1) to detect aberrant usage. The ANI/DNIS data includes the area code and telephone number of the telephone used to place the call. Using this data, IVR server 105 can determine from where the call is originating. If the time and place of origin of the call are substantially different than past usage, IVR server 105 generates an aberrant usage alarm. The alarm may consist of a notification to a human agent of station 150 (FIG. 2) who then calls the bank customer and notifies the customer of the aberrant usage. Alternatively, IVR server 105 may place an outbound call to the customer's home or office telephone and play a prerecorded message informing the customer of the aberrant usage.

In the travel industry it has become common to call a central number for flight (train) arrival and departure data. The menus in such situations seem unending. In our system, the menu can be adopted for each user by identifying from external data what the "most probable" data the caller desires.

For example, a caller from Dallas calls the 1-800 information number. The system can assume that the caller is interested in flights to/from DFW airport. If indeed this same caller, identified by his/her ANI data, has called earlier the task is easier, simply provide the data on the same flight as requested previously, as stored in the temporary data base. If the caller has not called earlier, but if the caller or someone with the same ANI number holds a ticket on a flight, the main choices again can be limited to the information directly provided without the caller giving many answers of the menu choices.

Catalog users, (or people ordering medicine from a national pharmacy) need not repeat long strings of numbers but rather can answer some very specific questions pertaining to their individual account based upon information obtained external of the menu. This type of anticipation based on external information reduces the wasted telephone time thereby increasing the utilization of the resources.

Although the present invention and its advantages have been described in detail, it should be understood that various changes, substitutions and alterations can be made herein without departing from the spirit and scope of the invention as defined by the appended claims.

What is claimed is:

1. An automated telephone system for receiving calls from a plurality of telephone lines coupled to said telephone system, presenting at least one menu message to callers, prompting said callers to select at least one desired application from a plurality of applications accessible by said telephone system, receiving selections from said callers, and connecting said callers to a selected application, said telephone system comprising:

means for identifying said callers;

a statistical engine coupled to said telephone system for monitoring said received selections of said identified callers;

means controlled from data gathered by said statistical engine for determining at least one preferred application of a first caller; and means for connecting an identified first caller directly to said at least one preferred application during a next call received from said first caller without presenting said at least one menu message.

2. The telephone system as set forth in claim 1 wherein said means for identifying comprises circuitry for decoding DTMF inputs received from said callers in response to a voice prompt message from said telephone system.

3. The telephone system as set forth in claim 2 wherein said DTMF inputs correspond to account numbers of said callers.

4. The telephone system as set forth in claim 2 wherein said DTMF inputs correspond to PIN numbers of said callers.

5. The telephone system as set forth in claim 1 wherein said means for identifying comprises circuitry for decoding ANI/DNIS data received from a telephone network.

6. The telephone system as set forth in claim 5 further comprising means for comparing a first ANI/DNIS data of a selected incoming call received from an unidentified caller with a second ANI/DNIS data stored in a selected call record associated with an account number received from said unidentified caller and generating a signal if said first ANI/DNIS data and said second ANI/DNIS data do not match.

7. The telephone system as set forth in claim 5 further comprising means for comparing a first ANI/DNIS data of a selected incoming call received from an unidentified caller with a second ANI/DNIS data stored in a selected call record associated with an account number received from said unidentified caller and generating a signal if a first geographical area associated with said first ANI/DNIS data is more than a maximum threshold distance away from a second geographical area associated with said second ANI/DNIS data.

8. The telephone system as set forth in claim 1 wherein said means for determining determines said at least one preferred application from a last N calls received from said first caller.

9. The telephone system as set forth in claim 1 wherein said at least one preferred application is determined by data showing said application is repeatedly accessed by said first caller on a first selected day of each month.

10. The telephone system as set forth in claim 1 wherein said at least one preferred application is determined by data showing said application is repeatedly accessed by said first caller on a first selected day of each week.

11. The telephone system as set forth in claim 1 wherein said at least one preferred application is determined by data showing application is repeatedly accessed by said first caller at a first selected time interval.

12. The telephone system as set forth in claim 1 wherein said at least one preferred application is determined by data showing a particular relationship between an identity of said first caller and a specific system application.

13. The telephone systems as set forth in claim 1 further comprising:
  means for selecting one or more predetermined options before said first caller calls said system,
  wherein said means for determining uses said predetermined options to determine said at least one preferred application.

14. The telephone system as set forth in claim 1 wherein said at least one preferred application is a non-voice application.

15. An automated telephone system for receiving calls from a plurality of telephone lines coupled to said telephone system and connecting callers to a plurality of interactive voice response (IVR) applications, said telephone system comprising:
  means for identifying said callers;
  means for generating at least one voice menu message, said at least one voice menu message comprising a plurality of selectable menu options and a prompt message prompting said callers to select one of said menu options by entering DTMF inputs on a push button telephone;
  means for receiving and decoding said DTMF inputs from said callers;
  a statistical engine coupled to said telephone system for monitoring said menu options selected by said callers, determining which of said plurality of IVR applications correspond to said menu options and updating a plurality of call records on a storage device coupled to said statistical engine, wherein each of said call records is associated with an individual caller and comprises IVR applications previously selected by said individual caller;
  means for determining at least one preferred application of a first caller from a first call record associated with said first caller; and
  means for connecting said first caller directly to said at least one preferred application during a next call received from said first caller without prompting said first caller to select said preferred application.

16. The telephone system as set forth in claim 15 where said means for identifying comprises circuitry for decoding for decoding DTMF inputs received from said callers in response to a voice prompt message from said telephone system.

17. The telephone system as set forth in claim 16 wherein said DTMF inputs correspond to account numbers of said callers.

18. The telephone system as set forth in claim 16 wherein said DTMF inputs correspond to PIN numbers of said callers.

19. The telephone system as set forth in claim 16 wherein said means for identifying comprises circuitry for decoding ANI/DNIS data received from a telephone network.

20. The telephone system as set forth in claim 19 further comprising means for comparing a first ANI/DNIS data of a selected incoming call received from an unidentified caller with a second ANI/DNIS data stored in a selected call record associated with an account number received from said unidentified caller and generating a signal if said first ANI/DNIS data and said second ANI/DNIS data do not match.

21. The telephone system as set forth in claim 20 further comprising means for comparing a first ANI/DNIS data of a selected incoming call received from an unidentified caller with a second ANI/DNIS data stored in a selected call record associated with an account number received from said unidentified caller and generating a signal if a first geographical area associated with said first ANI/DNIS data is more than a maximum threshold distance away from a second geographical area associated with said second ANI/DNIS data.

22. The telephone system as set forth in claim 15 wherein said means for determining determines said at least one preferred application from a last N calls received from said first caller.

* * * * *